Figure 1:
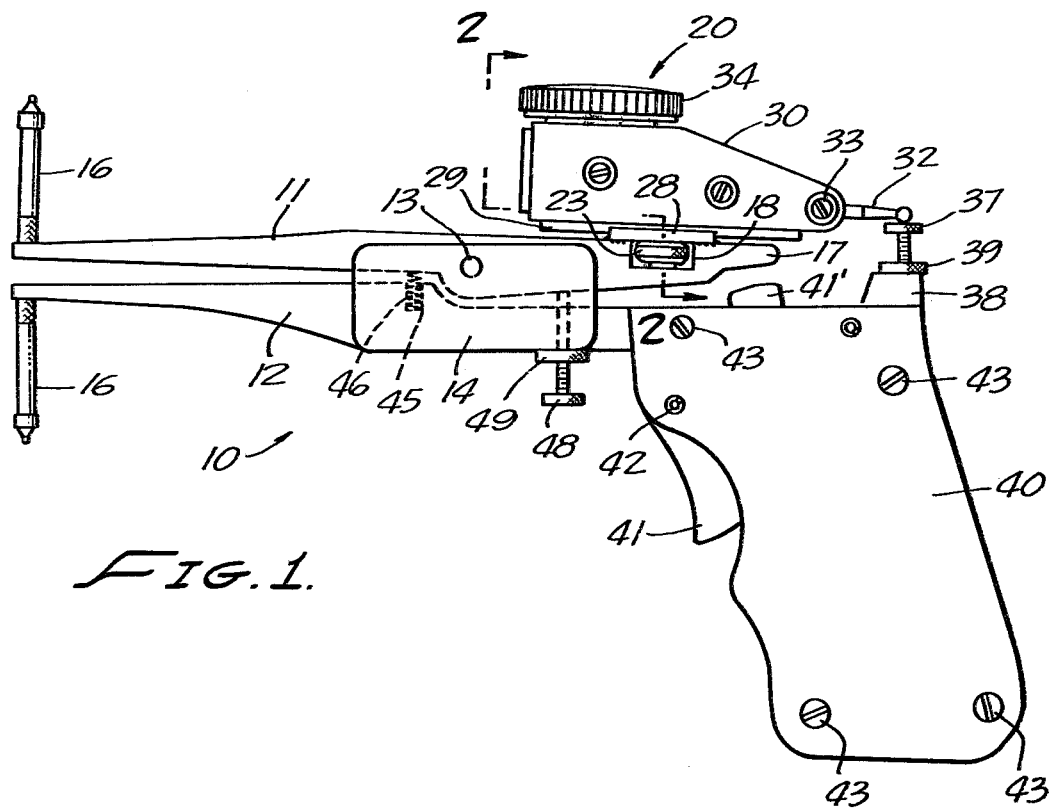

United States Patent [19]

Marcyan

[11] 4,397,092
[45] Aug. 9, 1983

[54] CALIPER WITH DIAL INDICATOR CLAMP AND PISTOL GRIP

[76] Inventor: Stanley T. Marcyan, 1860 Verdugo Loma, Unit C, Glendale, Calif. 91208

[21] Appl. No.: 275,852

[22] Filed: Jun. 22, 1981

[51] Int. Cl.³ .................................................. G01B 5/12
[52] U.S. Cl. ............................... 33/148 R; 33/178 R; 248/DIG. 4; 248/185
[58] Field of Search ......... 248/178, 186, 187, DIG. 4, 248/326, 176, 185, 223.4, 224.4, 229, 177, 183; 82/37; 33/178 R, 143 J, 172 B, 148 R, 147 K, 27 C, 203.21, 203.17, 159, 189, 147 F, 143 R, 148 E

[56] References Cited

U.S. PATENT DOCUMENTS

| | | | |
|---|---|---|---|
| 2,124,006 | 7/1938 | Parker | 248/DIG. 4 |
| 2,805,481 | 9/1957 | Locke | 33/147 K |
| 3,423,056 | 1/1969 | Welt | 248/185 |
| 4,126,940 | 11/1978 | Lendi et al. | 33/147 F |
| 4,323,182 | 4/1982 | Bott | 224/326 |

FOREIGN PATENT DOCUMENTS

| | | | |
|---|---|---|---|
| 585631 | 10/1959 | Canada | 33/148 R |
| 840924 | 6/1952 | Fed. Rep. of Germany | 33/148 R |
| 530117 | 12/1940 | United Kingdom | 33/178 R |

*Primary Examiner*—William D. Martin, Jr.
*Attorney, Agent, or Firm*—Sellers & Brace

[57] ABSTRACT

Caliper with a pistol grip and a simple two-piece clamp for releasably securing a dovetail-equipped dial indicator thereto. The caliper fingers are stabilized and strengthened along their midlength by bracket plates fixed to the sides of one finger and embracing the sides of the other finger.

10 Claims, 2 Drawing Figures

CALIPER WITH DIAL INDICATOR CLAMP AND PISTOL GRIP

This invention relates to calipers, and more particularly to an improved caliper having a pistol grip, an improved clamp for releasably securing a dial indicator thereto and a rugged pivot assembly for the caliper fingers.

SUMMARY OF THE INVENTION

There is provided by this invention a high precision hand-held caliper, one finger of which is equipped with simple rugged means for detachably securing a dial indicator thereto. The other finger is provided with a pistol grip and a trigger operated lever for manipulating the indicator equipped finger. The indicator is conveniently mounted directly above the trigger and is readily operated by the thumb and forefinger while the pistol grip is firmly grasped by the operator's remaining fingers. An improved simple, rugged clamp releasably anchors the indicator to one caliper finger. The caliper fingers are pivotally connected at their midlength by elongated sideplates embracing a substantial length of both the fingers and secured to one thereof.

It is therefore a primary object of this invention to provide an improved high precision caliper having a pistol grip and a simple dial indicator clamp manipulatable while grasping this grip.

Another object of the invention is the provision of a caliper having a pistol grip fixed to one finger thereof.

Another object of the invention is the provision of an improved caliper having an improved clamp featuring a nut and capscrew for securing a dovetail-equipped dial indicator thereto.

Another object of the invention is the provision of an improved caliper having improved means pivotally interconnecting and reinforcing its fingers.

These and other more specific objects will appear upon reading the following specification and claims and upon considering in connection therewith the attached drawing to which they relate.

Figure 2:
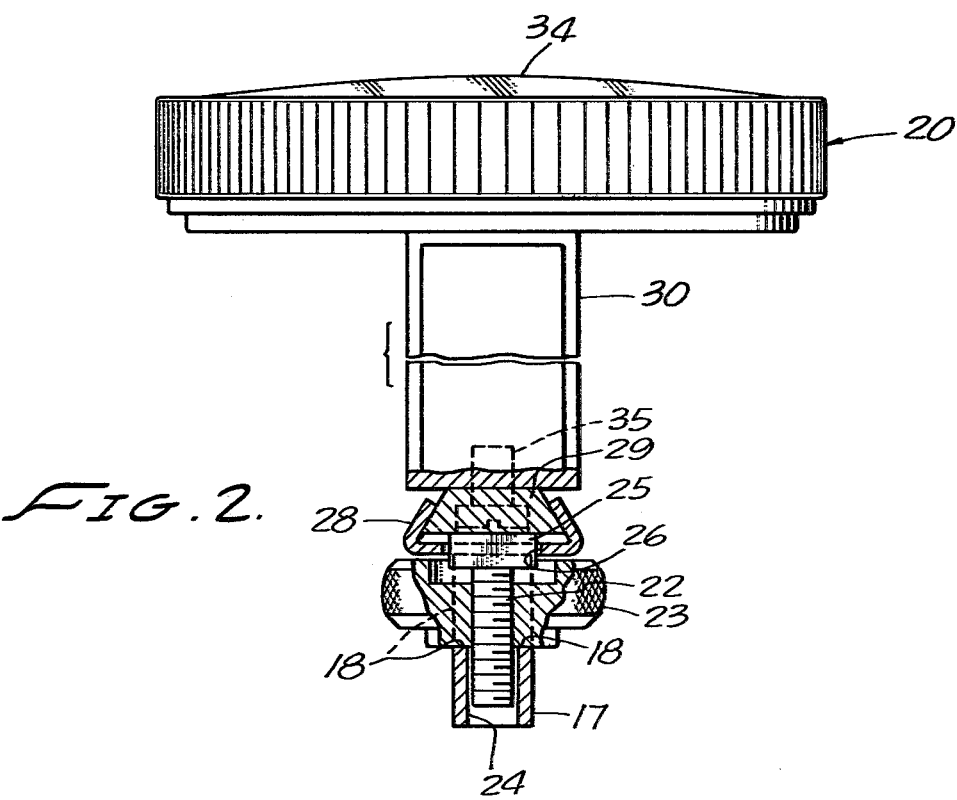

Referring now to the drawing in which a preferred embodiment of the invention is illustrated:

FIG. 1 is a side elevational view showing an illustrative embodiment of the invention caliper; and FIG. 2 is a fragmentary cross sectional view on an enlarged scale taken along the broken line 2—2 on FIG. 1.

Referring to FIG. 1, there is shown a caliper tool, designated generally 10, designed for use as a groove gauge to measure the width of a groove to high precision but embodying novel features equally useful in calipers generally. The tool has a main body comprising first and second fingers 11, 12 pivotally interconnected by pivot pin 13 having its opposite ends supported in a pair of bracket plates 14 located along either side of the fingers 11 and 12. Base plates 14 are bonded to the opposite sides of finger 12 with the upper portions of each closely embracing the opposite sides of finger 11. The forward end of each finger is provided with a precision point 16, 16 each provided with a threaded shank or other means for holding it detachably secured to a respective finger.

The rear end 17 of finger 11 is provided with a notch 18 suitably dimensioned to house a unique two-piece clamp for a dial indicator. The two-piece clamp comprises a cap screw 22 having a large diameter knurled nut 23 rotatably mounted on the shank thereof. The shank of screw 22 extends freely into a well 24 in the rear end 17 of finger 11. Cap screw 22 has a non-circular head 25 seating loosely within a complementally shaped non-circular opening 26 in the female dovetail member 28 extending lengthwise of finger 11 and across notch 18. The opposite ends of member 28 are brazed, silver soldered or otherwise firmly fixed to the edge of finger 11 as is best shown in FIG. 1. It will therefore be recognized that the dovetail member 28 bridges the notch 18 and very substantially reinforces and strengthens the notched rear end 17 of finger 11.

Dial indicator 20 has a casing 30 pivotally supporting a probe 32 on a pivot pin 33. The probe actuates a linkage within the casing in known manner to actuate an indicator needle pivoting over a precision scale underlying the transparent crystal 34. An elongated male dovetail member 29 is rigidly secured to the indicator casing 30 as by a plurality of cap screws 35. The heads of these screws are recessed in shallow wells opening through the lower wider surface of dovetail member 29.

The sphere at the outer end of the indicator probe 32 rests lightly against the top of an adjustable threaded stop screw 37 extending into a threaded well of a boss 38 at the rear end of finger 12. A knurled lock nut 39 mounted on the shank of this stop screw serves to lock this screw in any adjusted position.

The rear end of finger 12 is provided with a manipulating handle comprising a two-piece pistol grip housing a trigger type operating lever 41 pivotally mounted on a pin 42. The two parts of the grip are secured together and to finger 12 as by cap screws 43.

Finger 12 is provided with a notch or well 45 forwardly of pivot pin 13 interconnecting fingers 11 and 12 seating a compression spring 46 bearing against the adjacent lower edge of finger 11 and serving to pivot that finger clockwise as viewed in FIG. 1. Additionally finger 12 is provided with a threaded bore on the right hand side of pivot 13 supporting an adjustable stop screw 48 having its forward end bearing against the edge of finger 11. Stop screw 48 limits the pivotal movement of finger 11 clockwise under the influence of compression spring 46 and the lock nut 49 locks this stop screw in any desired adjusted position.

As shown in FIGS. 1 and 2, the dial indicator 20 is shown clamped to the caliper in readiness for use. As will be evident from FIG. 2, nut 23 has been rotated counterclockwise on cap screw 22 thereby elevating its head 25 against the bottom of the male dovetail member 29. This acts to force the lateral edges of member 29 into pressure contact with the inner surfaces of member 28 adequate to lock the dial indicator immovably in place on the caliper tool 10. At this time the lower end of nut 23 is of course pressed against the bottom of notch 18.

To detach the indicator from the caliper the operator rotates nut 23 upwardly toward the head 25 of screw 22 thereby retracting screw 22 and relieving the pressure of the cap screw head on the bottom of the male dovetail member 29. Usually less than one revolution of the nut suffices to release the clamping action of the two dovetail members 28, 29 thereby permitting the indicator instrument to be bodily withdrawn lengthwise from the left hand end of member 28.

Reassembly of the indicator is accomplished equally expeditiously and conveniently. The operator first checks to note that the cap screw 22 is retracted and then inserts the male member 29 in one end of member 28 until the sphere at the end of probe 32 is centered above the adjustable stop screw 37. He then rotates the knurled nut 23 to shift cap screw 22 upwardly against the bottom of male member 29 until the two dovetail members are firmly clamped together.

In the use of the caliper the operator mounts an appropriate set of points 16, 16, on the forward end of the fingers and then proceeds to use machinists' gauge blocks in known manner to just the stop screw 48 and lock nut 49 to clamp the fingers and the two points precisely at the desired distance apart in which position they are firmly but resiliently held by spring 46. The operator then adjusts stop 37 and nut 39 to position the dial indicator needle in a suitable position from which to measure the magnitude of any positive or negative variation from a specified groove width. This having been done, the user grasps the pistol grip 40 firmly and depresses trigger 41 whereby the trigger end 41' engages the rear end 17 of finger 11 and pivots the latter to retract points 16, 16. While so held, the points are inserted into and crosswise of the groove to be measured whereupon trigger 41 is released permitting spring 46 to separate the fingers until the points engage the opposite sides of the groove. The indicator reading is then taken and the variation in thousandths of an inch from the specification value is then noted.

While the particular improved caliper with dial indicator clamp and pistol grip herein shown and disclosed in detail is fully capable of attaining the objects and providing the advantages hereinbefore stated, it is to be understood that it is merely illustrative of the presently preferred embodiment of the invention and that no limitations are intended to the detail of construction or design herein shown other than as defined in the appended claims.

I claim:

1. A clamp for releasably clamping a dial indicator to a machinist's tool comprising:
    an elongated tool member having an open-ended notch transversely thereof bridged by an open-ended female dovetail member extending lengthwise of said tool member and adapted to slidably seat a cooperating conventional male dovetail member rigidly attached to the main body of a dial indicator;
    said female member having a bore through the bottom thereof;
    a cap screw having its head positioned in said bore and its shank extending into said notch and including means for holding said screw against rotation; and
    a knurled nut rotatably mounted on said cap screw effective to hold said cap screw loosely assembled to said tool member and rotatable when the male dovetail member is assembled in said female dovetail member to force the head of said screw against said male member and clamp the same immovably but releasably in place in said female member.

2. A dial indicator clamp as defined in claim 1 characterized in the provision of means rigidly connecting said tool member to the opposite ends of said female dovetail member on the opposite sides of said notch.

3. A dial indicator clamp as defined in claim 1 characterized in that the head of said cap screw and said bore through said female dovetail member are non-circular and cooperate in restraining rotation of said cap screw during adjustment of said nut along the shank thereof.

4. In combination, a caliper equipped with a precision clamp for a dial indicator comprising:
    a caliper having first and second elongated fingers pivotally interconnected between the forward and rear ends thereof;
    the rear end portion of said first finger being notched transversely thereof which notch is bridged by an outwardly facing female dovetail member open at either end and secured immovably to said first finger;
    a dial indicator having a male dovetail member mateable with said female member and having a needle operating probe seatable against a stop carried by the rear end of said second finger;
    a cap screw extending loosely and nonrotatably through said notch and through the bottom of said female member; and
    nut means on the threaded shank of said cap screw rotatable in one direction to shift one end of said cap screw in a direction to clamp said male and female members immovably together and rotatable in the opposite direction to release the clamping action between said male and female members.

5. The combination defined in claim 4 characterized in that said second finger includes a well and a threaded bore at points adjacent said pivot both extending toward the adjacent edge of said first finger;
    stop screw means in said threaded bore adjustable toward and away from the juxtaposed surface of said first finger;
    spring means in said well operable to bias said first finger against said stop screw means; and
    reinforcing plate means fixed to the opposite faces of said second finger in areas overlapping said well and said threaded bore.

6. The combination defined in claim 5 characterized in that said plate means extending along the opposite sides of said first and second fingers includes a pivot pin extending through said first finger and said plate means.

7. The combination defined in claim 5 characterized in the provision of pistol-type grip means secured to the rear end portion of said second finger, and trigger-like lever means movably supported on said grip means operable by the user's finger to contact the rear end of said first finger and pivot the forward end thereof in opposition to said spring means.

8. In combination, a hand-held caliper comprising:
    a pistol type grip fixed to the rear end of one of a pair of pivotally connected fingers having the forward ends thereof spring-biased apart and against adjustable stop means;
    a female dovetail member fixed to the rear end of said movable finger.
    dial indicator means having a male dovetail member slidably seatable in said female member;
    nut and cap screw means operatively associated with said female member which nut is rotatable to advance said cap screw non-rotatably against said male member to lock said indicator means releasably assembled to said female member with the sensing probe of said dial indicator resting against an adjustable stop fixed to the pistol grip end of said caliper; and
    lever means on said grip manipulatable to pivot said movable finger away from said stop means.

9. The combination defined in claim 8 characterized in that said pivotally connected fingers include reinforcing plates fixed to the opposite sides of one of said fingers and movably embracing the opposite sides of the other finger and supporting the ends of a pivot pin on which said other finger pivots; and the opposite ends of said plates overlapping a spring well and a threaded bore for manually adjustable stop means mounted therein and which well and bore are located in one of said fingers and on the opposite sides of the pivot interconnecting said fingers.

10. The combination defined in claim 8 characterized in that said female dovetail member bridges a notch across one edge of said movable finger and is fixed to the opposite sides of said notch to reinforce the portion of said finger weakened by the presence of said notch.

* * * * *